July 28, 1953 J. LIEBERMANN 2,647,190
CONTROL APPARATUS
Filed March 28, 1951 2 Sheets-Sheet 1

INVENTOR.
JOHN LIEBERMANN
BY
ATTORNEYS

July 28, 1953 — J. LIEBERMANN — 2,647,190
CONTROL APPARATUS
Filed March 28, 1951 — 2 Sheets-Sheet 2
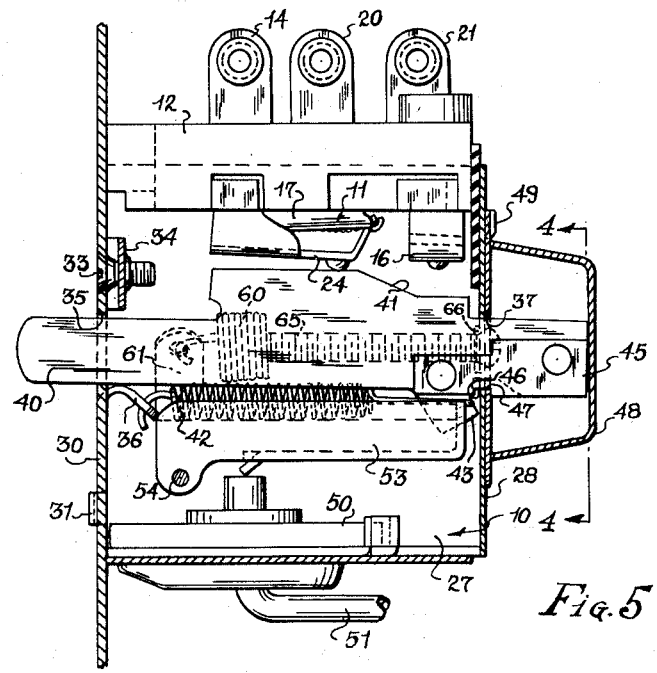
Fig. 5
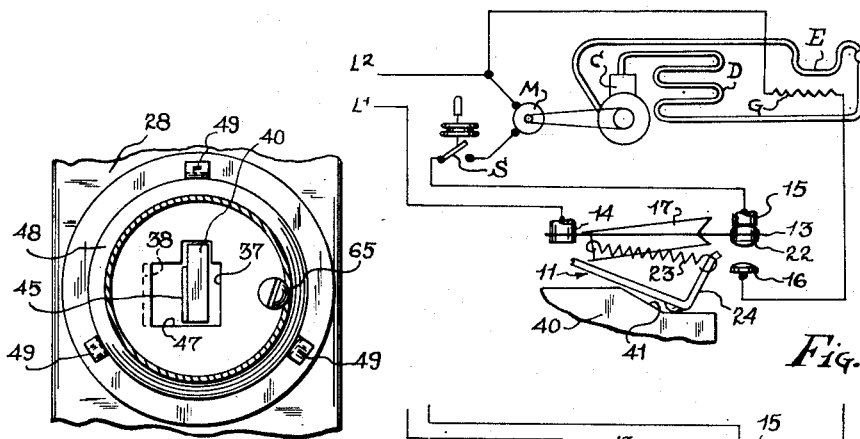
Fig. 4
Fig. 6
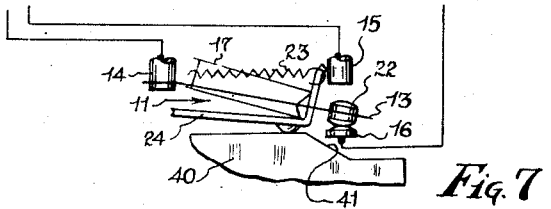
Fig. 7
INVENTOR.
JOHN LIEBERMANN
BY Hudson, Doughton,
Williams, David & Hoffmann
ATTORNEYS Patented July 28, 1953

2,647,190

UNITED STATES PATENT OFFICE 2,647,190

CONTROL APPARATUS

John Liebermann, Columbus, Ohio, assignor to Ranco Inc., Columbus, Ohio, a corporation of Ohio Application March 28, 1951, Serial No. 218,015

3 Claims. (Cl. 200—140)

The present invention relates to a control apparatus, and more particularly to a refrigerator control apparatus by which a defrost cycle of the refrigerator can be manually initiated and automatically terminated.

In general, the object of the present invention is the provision of a control apparatus for a refrigerator, which apparatus has a manually operable member movable from a normal refrigeration control position to a latched position to actuate the apparatus to establish a defrost cycle in the refrigerator and which member is released by a device responsive to the temperature of the refrigerator cooling unit to restore the apparatus to normal operation and terminate the defrost cycle, the construction of the control apparatus being such that it can be manufactured relatively inexpensively and provide accurate, dependable operation.

A more specific object of the present invention is the provision of a control apparatus comprising a housing inclosing a control device, such as an electrical switch, which is actuated by a manually movable member slidably mounted in openings in opposite walls of the housing and which control actuating member is normally urged to an inoperative position and is provided with a shoulder for latchingly engaging a part of the housing when the member is moved to a position to operate the control device, the member being movable to release its shoulder from the engaged part of the housing by a temperature responsive power element adapted to move according to the temperature of the cooling unit of the refrigerator.

Other objects and advantages of the invention will be apparent from the following description of the preferred embodiment of the invention, reference being made to the accompanying drawings, wherein:

Fig. 4 is a sectional view taken along line 4—4 of Fig. 5;

Fig. 5 is a view similar to Fig. 1 but showing certain parts in different positions;

Fig. 6 is a schematic view of the control apparatus connected in the control circuit of an electric motor driven refrigerator system, the parts being shown for producing normal refrigerating cycles; and Fig. 7 is a view similar to Fig. 5 but showing certain parts of the control apparatus only, and which apparatus is set to produce a defrosting cycle of the refrigerator.

Figure 1:
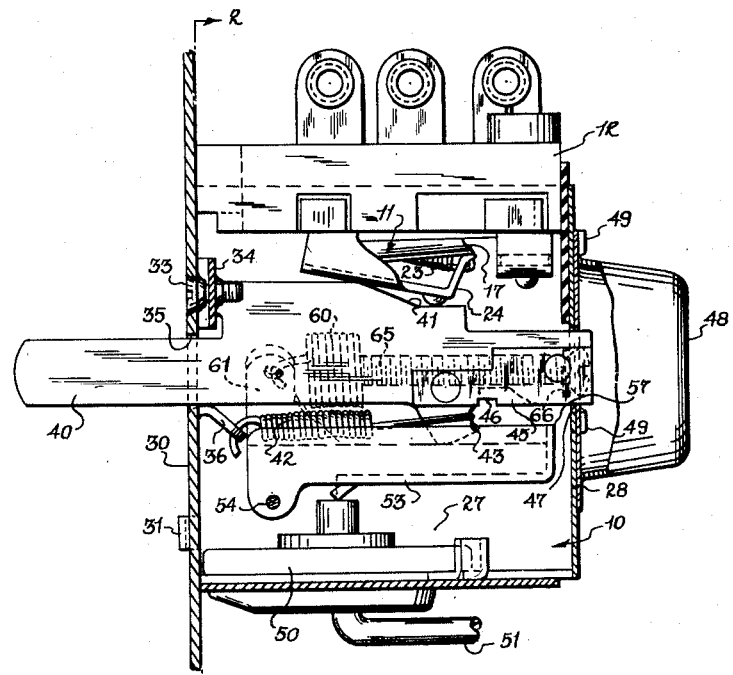
Fig. 1 is a sectional view of a control apparatus embodying the invention, the section being taken along line 1—1 of Fig. 2.
Figure 2:
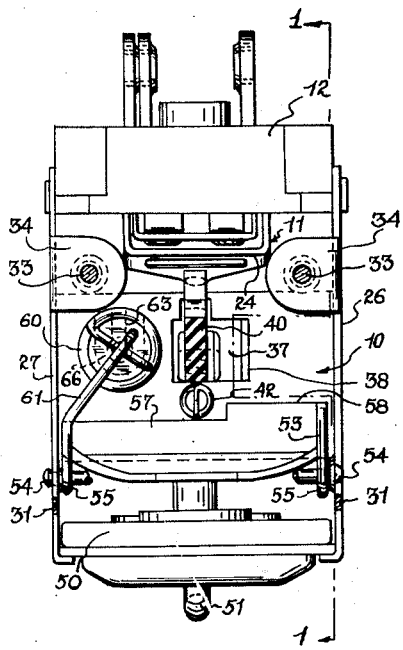
Fig. 2 is a sectional view of the apparatus taken along line 2—2 of Fig. 1.

In the embodiment of the invention shown, the control apparatus comprises a housing 10 having a control device therein in the form of an electrical snap switch 11. Any suitable control device or switching mechanism may be employed and in the form shown the snap switch mechanism is mounted on a block 12 of suitable insulating material and comprises a contact blade 13 supported at one end to a terminal post 14 and having the other end swingable between two spaced fixed contacts 15, 16 by a snap acting toggle link 17. The contacts 15, 16 are attached to suitable terminal members 20, 21, respectively, and the blade 13 has a contact 22 which alternately engages contacts 15, 16 as the blade is moved from one to the other by the toggle link. One end of the toggle link 17 is pivoted to blade 13 and the opposite end is snap actuated between spaced stop means by a tension spring 23, one end of which is connected to the toggle and the other end of which is connected to an actuating lever 24. The lever 24 is arranged to be biased downwardly, as viewed in the drawings, at all times by the tension of spring 23. The snap acting switch mechanism just described is like that disclosed and claimed in the application of E. C. Raney, Serial No. 168,747, filed June 17, 1950.

The housing 10 preferably comprises a U-shaped sheet metal member which provides two opposite side walls 26, 27 interconnected by a rear wall 28. The block 12 is suitably attached between the walls 26, 27 at the upper ends thereof and the block provides a closure for the top of the housing.

Figure 3:
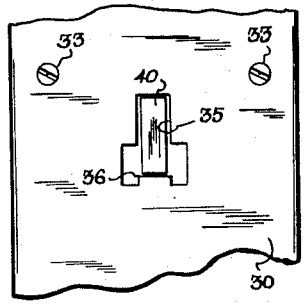
Fig. 3 is a fragmentary elevational view of the front of the control apparatus.

The forward end of the housing is preferably closed by a metal plate 30, which plate is attached to the forward edges of the walls 26, 27 by a pair of turned in lugs 31, which project through bayonet type slots and overlie the plate and the upper portion of the plate is secured to the walls by screws 33 threaded in lugs 34 on the walls. The plate 30 has an opening 35 therein which is preferably formed by a punch die, and a lug 36 is formed of a part of the punched metal turned inwardly at the bottom of the opening as shown in Figs. 1 and 3. The plate 30 may be utilized for attaching the control apparatus to a suitable panel of the refrigerator, if desired.

The rear wall 28 of the housing has an opening 37 which is similar to opening 35 in plate 30, but in this case the lower edge of opening 37 has no projections thereon and forms a catch, as is described more fully hereinafter. Preferably, the opening 37 is formed in part, at least, by punching out a lug 38 and turning the lug inwardly so that its lower edge forms an abutment extending inwardly from the lower part of the opening.

A manually operable switch actuating plunger 40, which is preferably formed of a strip of insulating material, is slidingly supported in the openings 35, 37 and is adapted to be guided for longitudinal movement in the housing by the sides of the upper portions of these openings. The upper side of the member 40 has a cam formation 41 which engages the lever 24 of the switch mechanism and is adapted to raise the lever and cause the toggle link to snap the blade 13 to move contact 22 from contact 15 to contact 16 when the member 40 is moved to the right, as seen in Figs. 1 and 5. The forward or left hand end of the formation providing cam 41 is adapted to abut the inside of the plate 30 and limit outward movement of the member 40.

The member 40 is biased outwardly, that is to say toward the left as viewed in the drawings, by a spring 42, one end of which is hooked in an opening in the lug 36 and the other end of which is hooked to a spur 43 depending from the lower edge of member 40. It will be noted that by locating the spring on the underside of the member 40 the spring 42 not only biases member 40 to the left, but it also draws the rear or right hand end thereof downwardly.

The member 40 is adapted to be latched in its inward position, that is to say, the position in which the switch actuating lever 24 is cammed upwardly, and for this purpose, a metal plate 45 is secured to one side and at the portion of the member supported in opening 37. A notch 46 is formed in the overhanging edge of plate 45, which notch is formed to receive the edge 47 of the opening 37 therein, as may be seen in Fig. 5, when member 40 is pressed inwardly. The tension of spring 42 urges the rear end of member 40 downwardly so that the notched portion of plate 45, which is integral with the member 40, drops downwardly when notch 46 is moved into registration with edge 47. The lower edge of member 40 is recessed opposite notch 46 so that the edge of the member does not interfere with the latching action between the notched portion of plate 45 and the housing edge 47. It will be seen that the rear side of notch 46 forms a shoulder which abuts the edge 47 to prevent retraction of member 40 by the spring 42. Thus, member 40 is latched in position to hold switch lever 24 in its upper position.

Preferably, a flanged cap 48 is attached to the rear wall 28 to enclose the end of member 40 which projects through the wall and to prevent the entrance of foreign material into the housing, and the cap is secured by ears 49 struck from the wall and overturned on the flange of the cap.

The member 40 is adapted to be unlatched by a temperature responsive device to move to the left or outwardly by the spring 42 and release lever 24 to cause toggle link 17 to snap blade 13 and move contact 22 from contact 16 to contact 15. The temperature responsive device may be of any suitable construction, and in the form shown it comprises a hollow expansible element 50 which has a closed tube 51 connected therewith, which element and tube are filled with a thermal responsive fluid which changes in volume according to temperature. A portion of the tube 51 is disposed in heat exchange relation with the evaporator, and as the temperatures of the evaporator increase, the element 50 expands and moves against a lever 53 which is pivoted between the housing walls 26, 27 on a pin 54. The lever 53 preferably comprises a stamped piece of sheet metal having a pair of lugs 55 on opposite sides at one end which are pivoted on the pivot pin 54, and the free end of the lever has an upturned portion 57 which is arranged to engage the lower edge of the plate 45 and to thereby raise the member 40 and clear the rear wall of notch 46 from the wall edge 47, thereby releasing the member from its latched position. The upper edge of portion 57 has a raised section 58 which forms a shoulder which abuts the lower edge of lug 38 to limit the upward movement of the lever 53 and prevent a condition which might clamp member 40 to the upper edge of opening 37.

The temperature at which the temperature responsive element is operative to release member 40 is determined by the resistance to movement of lever 53 and this resistance is provided by an adjustable tension spring 60. One end of spring 60 is attached to an arm 61 formed on the lever 53 and the opposite end of the spring has a nut 63, the periphery of which has threads to receive the convolutions of the spring to secure the nut to the spring, and a bolt 65 is threaded in the nut and has its head end rotatably journalled in an opening in the rear wall 28. The head of the bolt is preferably slotted so that the bolt may be rotated relative to the nut by a screw driver to move the nut along the bolt and vary the tension of the spring 60. The head of the bolt 65 is held to the wall 28 by a split washer 66 engaging in a circular groove in the bolt adjacent to the head. It will be seen that the tension spring 60 opposes counterclockwise movement of the lever 53 by the element 50, and it will be readily understood by those familiar with the art that the tension of the spring determines the temperature at which the member 40 is released from its latched position.

For the purposes of illustrating the operation of the control apparatus, a refrigerator system is shown schematically in Fig. 6 which comprises a compressor C, a condenser D and an evaporator E, all connected in the well known compressor-condenser-expander circuit, and a motor M drives the condenser. The power for motor M is supplied through lines L1, L2 and the operation of the motor is controlled by a conventional thermostatic switching mechanism S which, for example, is responsive to the temperature of the evaporator to start and stop the compressor at predetermined high and low temperatures, respectively, which temperatures are below the freezing point of water. An electrical heating unit G is disposed adjacent to the evaporator so that when it is energized it melts any frost or ice which might be on the evaporator.

The control apparatus is connected in the circuit for the compressor motor M by connecting L1 with terminal 14 and terminal 20 with one side of the thermostatic switch S. The other side of the switch S is connected to one lead of the motor and the other motor lead is connected to L2. It will be seen that the operation of the motor is dependent upon contact 22 engaging contact 15 and in this event, the refrigerator system operates according to switch S to provide normal refrigerating cycles.

One side of heater G is connected to L2 and the other side is connected to terminal 21 so that when blade 13 moves contact 22 to engage contact 16, the heater is energized and the motor circuit is broken at contact 15.

When the member 40 is in its normal position, that is to say the position shown in Fig. 1, switch contact 22 engages contact 15 and the refrigerator compressor operates according to the control switch S. When the user of the refrigerator desires to initiate a defrost cycle to melt accumulated frost from the evaporator, member 40 is pressed inwardly until the notch 46 of the plate 45 is moved over the lower edge 47 of the opening 37 causing the member 40 to be latched in the position shown in Fig. 5. As the member 40 is moved inwardly, cam 41 operates switch lever 24 and contact blade 13 snaps contact 22 from contact 15 to contact 16 thereby breaking the circuit of the compressor motor M and establishing the circuit for heater G. The heater G rapidly melts the ice or frost from the evaporator, and as the temperature of the evaporator rises, element 50 expands until the temperature corresponding to the resistance of spring 60 is obtained at which time lever 53 is moved upwardly by the element 50 to release member 40 which moves forwardly thereby releasing the actuating lever 24 to deenergize the heater and restore the normal control circuit.

Alternatively, the switch 11 could operate a solenoid valve to direct hot gas through the evaporator of the refrigerator if such method of defrosting the evaporator is used in place of an electric heater. In such event, the switching mechanism 11 would not control the compressor motor. Furthermore, it might be desirable to substitute a valve for the switching mechanism, which valve would be controlled directly according to the position of member 40.

It will be seen that the construction of the control apparatus is relatively simple and thereby inexpensive to manufacture. The arrangement of the guide for the push member 40, the latch mechanism and actuating spring 42 cooperate to provide an extremely simple and effective construction.

It is to be understood that although one form of the invention is shown, other forms might be adoptable all of which follow within the scope of the following claims.

Having thus described my invention, I claim:

1. In a control apparatus comprising a control device, a housing for the control device, said housing including opposite walls formed of sheet metal, one of said walls having metal thereof punched inwardly and downwardly to form an opening in said wall and to provide an inwardly projecting lug, a portion of the other of said walls being punched inwardly to form an opening and to provide an abutment projecting inwardly intermediate the top and bottom of said opening, a reciprocable actuating member for the control device, said member being guidable longitudinally in the openings in said wall, a spring connected at one end to said lug and connected at its other end to the bottom portion of said actuating member and biasing said member in one direction, a shoulder on the lower edge of said member adapted to cooperate with said housing at the bottom edge of the opening in said other wall to restrain movement of said member by said spring, and temperature responsive means for moving said member upwardly to displace said shoulder from said edge portion to release said member.

2. In a control apparatus comprising a control device, a housing for the control device having openings in opposite walls, a reciprocable actuating member for said control device slidable longitudinally in said openings in said walls and adapted to actuate said control device when moved between two control positions, said member being movable laterally in one of said openings, a spring biasing said member toward one of said control positions, said member having a notch therein adapted to receive an edge portion of said one opening when said actuating member is moved to the other of said control positions to latch said member against movement thereof by said spring, a lever pivoted in said housing on an axis parallel to said opposite walls, said lever extending longitudinally of said actuating member and having a part thereof engageable with said member, a spring connected to said lever and urging the latter about its pivot to tend to move said part thereof from said member, and an expansible thermally responsive element adapted to urge said lever against the action of the last mentioned spring to cause said lever to move against said member and shift said member laterally and release the notched portion thereof from engagement with said edge portion.

3. In a control apparatus comprising a control device, a housing for the control device having openings in the front and rear walls thereof, an elongated reciprocable actuating member guidable longitudinally by the edges of the openings in said walls and having the forward and rearward portions thereof projecting from said openings respectively, the rearward portion of said member being movable laterally in the opening in said rear wall, said actuating member operable to actuate said control device to one control position when moved to a rearward position and to a second control position when moved to a forward position, a spring biasing said member toward its forward position, said member having a notch therein adapted to receive an edge portion of the opening in said rear wall when said actuating member is moved to said rearward position, a lever pivoted on an axis parallel to said opposite walls, said lever extending longitudinally of said actuating member and having a part engageable with said member, a spring connected to said lever and urging the latter about its pivot to tend to move said part thereof from said member, means including a rotatable member supported by said rear wall to adjust the tension of the last mentioned spring, an expansible thermally responsive element adapted to urge said lever against the action of the last mentioned spring to cause said lever to move against said member and shift said member laterally and release the notch therein from engagement with said portion of said one wall, and a cover detachably connected with said housing and enclosing said spring adjusting means and the portion of said actuating member projecting through said rear wall.

JOHN LIEBERMANN.

References Cited in the file of this patent
UNITED STATES PATENTS

| Number | Name | Date |
|---|---|---|
| 941,016 | Erickson | Nov. 23, 1909 |
| 2,156,946 | Closson et al. | May 2, 1939 |
| 2,318,076 | Johns | May 4, 1943 |